United States Patent Office 3,663,678
Patented May 16, 1972

3,663,678
METHOD OF USING SHRINKABLE PLASTICS
Joseph T. Miller, St. Louis County, Mo., assignor to Sinclair & Rush, Inc., St. Louis, Mo.
No Drawing. Filed Sept. 8, 1969, Ser. No. 856,167
Int. Cl. B29c 17/02
U.S. Cl. 264—230
6 Claims

ABSTRACT OF THE DISCLOSURE

A shrinkable synthetic polymer part produced by swelling the part in solvent with subsequent "freezing" of the part in the enlarged state. The expanded part can be applied over the part to be covered and shrunk by the application of heat or solvent. The part preferably is of polyvinyl chloride.

BACKGROUND OF THE INVENTION

The use of heat shrinkable plastic sleeves is wide spread in the electrical field for applying insulating coatings and in the pipe field for covering pipe joints. These sleeves generally are made by irradiating a polyolefin to crosslink the polymer, heating the polymer and stretching it to an enlarged shape, cooling the enlarged part to freeze the part in its enlarged shape and thereafter applying the part to a pipe joint or electrical connection and heating the part to shrink it back to its original size. This process is satisfactory, but extremely expensive because of the cost of the irradiation equipment required for crosslinking. Chemical crosslinking also has been used in making heat shrinkable parts, as has purely mechanical stretching with heat and subsequent cooling. This latter method is strictly a stretching of the plastic.

It is an object of the present invention to provide an inexpensive method of making heat shrinkable synthetic polymer parts. It is a further object of the invention to make a heat shrinkable part from a vinyl polymer without the necessity of crosslinking the polymer.

These and other objects and advantages will become apparent hereinafter.

SUMMARY OF THE INVENTION

This invention provides a method of making heat shrinkable synthetic thermoplastic polymer parts by swelling the part in a solvent with subsequent "freezing" of the part in the enlarged state. The expanded part can be applied over the part to be covered and shrunk by the application of heat or solvents. The present invention further comprises the methods and objects hereinafter described and claimed.

DETAILED DESCRIPTION

The present invention comprises the forming of an object in the shape of a sleeve, end cover, sheet material, tape, or the like of a thermoplastic polymer, preferably vinyl polymer such as vinyl, polyvinyl chloride or vinyl chloride-acetate copolymers. A suitable plastic is polyvinyl chloride made by extrusion, dip molding or injection molding. The vinyl part is placed in a solvent such as toluol and acetone (preferably in a 9 to ratio) or in a vapor degreaser of the trichlorethylene or perchlorethylene types for a sufficient time to swell the plastic. Preferably the plastic is swollen to about 30% to 40% increase in size. There is no heat involved nor any catalyst or additives. The vinyl is not expanded by heat and stretching combination and there is no irradiation or chemical crosslinking. Furthermore, it is not necessary to cool the swollen part as in prior arts.

The next step in the process is the "freezing" of the dilated or swollen part so that the part will maintain its enlarged state. This is necessary if the part is manufactured and swollen at a place remote from its intended final use.

In accomplishing the freezing of the part in its enlarged shape, the part is placed onto a mandrel or on some other form of restrictive device and the solvent evaporated therefrom. Heat can expedite removal of the solvent as can a vacuum environment or a combination of the two. These steps are strictly to expedite removal of the solvents and are not necessary as the solvent will evaporate at room temperature.

As an alternative procedure, the solvent filled part can be further expanded by the application of compressed air or other mechanical means such as being drawn over a greatly enlarged mandrel. This could enlarge the part several hundred percent. No heat is necessary as the increased elasticity of the dilated vinyl part facilitates further expansion.

After the solvents have been evaporated, the part is removed from the mandrel and will retain its enlarged shape until heat is applied. When this happens, the plastic memory of the part causes it to revert back to its original state. The part is placed over an object to be covered in its enlarged form and as the object is larger than the original size of the part, when the part is heated it will shrink into a tight conforming relation to the object and will frictionally adhere thereto.

Generally, the part is heated to a temperature of 212° F. to 375° F. for about one to five minutes depending upon wall thickness to cause it to shrink back to its original state.

An alternative method for shrinking the part is to apply solvents thereto. As the solvent evaporates from the part, the part reverts back to its original state.

Generally the part must remain in the solvent from about 5 to 20 minutes for maximum expansion depending on the use of a vapor degreaser or simple solvent procedure. Evaporation of the solvents will depend upon the use of secondary procedures such as increased heat or vacuum to drive the solvents from the part. Maximum time at room temperature will take approximately one day depending upon the wall thickness. Once the solvents are driven off, the part is frozen in the expanded state. The part preferably is expanded by about 50% to 300%.

When the parts are dilated, the vinyl (resin) swells. This expands the part. While this swelling is going on, a minor amount of plasticizer is forced out of the plastic molding. After the part has been dilated and stretched onto a larger mandrel, and the solvents evaporated and the part is subsequently shrunk, the unit will actually be slightly smaller in dimensions than the original state. There is less matter within the plastic, thus one ends up with a smaller part. For example, a 1" I.D. tube can be expanded to 2" I.D. The part is frozen. With the application of heat, the part could shrink to .937" I.D. The degree of shrinkage depends upon the amount of time the part is subjected to the solvents, hence the amount of plasticizer removed.

Following is a specific example of a part made in accordance with the present invention.

Example No. 1

An original sized piece of polyvinyl chloride tubing measuring 2" inside diameter by 6" long is used. The wall thickness of the tube is approximately .080". The solvents are a combination of toluol (90%) and acetone (10%).

The plastic tube is inserted into the solvent for approximately 20 to 30 minutes. The vinyl absorbs the solvent resulting in expansion of the plastic item. Expansion results in an approximate increase in wall thickness to .104", diameter to 2.60", and length to 7.8". The elasticity of the vinyl tube is greatly increased.

This expanded tube is applied onto a mandrel to restrict any subsequent shrinkage as the tube begins shrinking immediately upon removal from the fluid although this is not readily apparent. The mandrel size can range from a minimum of slightly larger than the original tube inside diameter to a maximum of approximately 300%. To achieve the 300% shrinkage, the features of expanded size with a substantial increase in elasticity is combined without the use of heat. The tube is stretched onto a 6" mandrel.

When the solvents evaporate in a maximum of one day at room temperature, the tube is frozen in the expanded size. The mandrel is removed and the tube retains the enlarged design. There is no heating or cooling operation as necessary with prior arts to achieve this frozen state. The vinyl is frozen in the swelled and stretched state. The wall thickness also shrinks as the solvent evaporates.

Application of the expanded tube can be done onto any object less than 6" inside diameter and at least 2" inside diameter. The tube is applied over a unit having two diameters of 3" and 4", and it is shrunk to conform to both diameters by heating to 212° to 375° at which time the tube shrinks due to plastic memory and shrinkage of the expanded vinyl. It continues to shrink until restricted by the two prior mentioned diameters resulting in a snug, conforming seal.

Shrinkage of the expanded and frozen plastic tube can be accomplished by reactivation by solvents. It will shrink to the same degree as with heat although you will have to wait approximately one day at room temperature for complete shrinkage.

This invention is intended to cover all changes and modifications of the example of the invention herein chosen for purposes of the disclosure which do not constitute departures from the spirit and scope of the invention.

What is claimed is:

1. A method of making a heat shrinkable synthetic polymer part comprising the steps of
   (a) placing a part made of synthetic polymer in a solvent and maintaining it there until it has enlarged to the desired size without cross-linking or heating and cooling,
   (b) maintaining the enlarged part in its enlarged size until the solvent has dried therefrom to form a stable part of said enlarged size,
   (c) thereafter positioning said part over an object to be covered, and
   (d) applying heat to the part to shrink the same into close conformity with said object.
2. The method of claim 1 wherein the part is of vinyl polymer.
3. The method of claim 1 wherein the part is of polyvinyl chloride.
4. The method of claim 1 wherein said enlarged part is applied to a mandrel, and maintained there as the solvent is evaporated from said part.
5. The method of claim 1 including the steps of expanding said swollen part to even larger size mechanically, and maintaining said larger size as the solvent is evaporated from the part.
6. The method of claim 1 wherein the part is heated to between about 212° F. and 375° F. for about 1 to about 5 minutes to shrink the part around the object being covered.

References Cited
UNITED STATES PATENTS

| | | | |
|---|---|---|---|
| 2,712,490 | 7/1955 | Stuchlik | 264—343 |
| 3,443,006 | 5/1969 | Simons et al. | 264—343 |
| 2,142,150 | 1/1939 | Replogle | 264—343 |
| 3,253,619 | 5/1966 | Cook et al. | 264—230 |
| 3,470,046 | 9/1969 | Verdin | 264—230 |
| 3,225,129 | 12/1965 | Taylor | 264—230 |

ROBERT F. WHITE, Primary Examiner

R. H. SHEAR, Assistant Examiner

U.S. Cl. X.R.

264—94, 342, 343